United States Patent [19]

Sfirakis et al.

[11] Patent Number: 5,386,674
[45] Date of Patent: Feb. 7, 1995

[54] TWO PIECE BULKHEAD DOOR FOR RAIL CARS AND THE LIKE

[75] Inventors: Alexander Sfirakis, Highland, Ind.; Herman J. Yost, Hinsdale, Ill.

[73] Assignee: Joseph T. Ryerson & Son, Inc., Chicago, Ill.

[21] Appl. No.: 947,513

[22] Filed: Sep. 17, 1992

[51] Int. Cl.⁶ .............................................. B61D 45/00
[52] U.S. Cl. .................... 52/243.1; 410/134; 49/503
[58] Field of Search ............ 52/243.1, 64, 309.1, 52/795, 799; 410/132, 150, 154, 121, 129, 130, 134, 139; 49/360, 361, 365, 371, 380, 394, 501, 503, 404, 409, 449

[56] References Cited

U.S. PATENT DOCUMENTS

| | | | |
|---|---|---|---|
| 3,029,747 | 4/1962 | Shaver | 410/132 X |
| 3,199,261 | 8/1965 | Soddy | 52/795 X |
| 3,208,403 | 9/1965 | Magarian et al. | 410/134 |
| 3,209,707 | 10/1965 | Erickson et al. | 410/134 X |
| 3,292,321 | 12/1966 | Vander Schans | 52/243.1 |
| 3,348,337 | 10/1967 | Grasso | 49/503 X |
| 3,512,305 | 5/1970 | Multer | 49/503 |
| 3,648,623 | 3/1972 | Erickson | 410/134 |
| 3,735,712 | 5/1973 | Krokos et al. | 410/134 |
| 4,247,237 | 1/1981 | Brown | 410/121 |
| 4,345,862 | 8/1982 | Bloot et al. | 410/134 |
| 4,913,485 | 4/1990 | Moffat et al. | 52/309.1 X |
| 4,957,250 | 9/1990 | Hararat-Tehrani | 410/154 X |
| 5,193,319 | 3/1993 | Claassen et al. | 52/243.1 |
| 5,217,184 | 6/1993 | Hararat-Tehrani | 410/121 X |

FOREIGN PATENT DOCUMENTS

| | | | |
|---|---|---|---|
| 2180192 | 7/1990 | Japan | 410/154 |
| 288277 | 3/1965 | Netherlands | 410/132 |

Primary Examiner—Peter M. Cuomo
Assistant Examiner—Suzanne L. Dino
Attorney, Agent, or Firm—Marshall, O'Toole, Gerstein, Murray & Borun

[57] ABSTRACT

A uniquely designed two piece bulkhead door for box cars in the railroad industry. The bulkhead door is made of steel side frame members and steel frame cross members using ultra-high strength resilient steels and includes a plurality of "slide in" impact and chemically resistant thermoplastic composite modular panels. This device is used to restrain, secure and separate cargo in freight railroad cars. This load divider presents a number of exceptional features such as light weight construction, modular design, an ergonomically designed handle and structurally effective hardware. The bulkhead door fulfills the impact resistance performance requirements.

25 Claims, 3 Drawing Sheets

TWO PIECE BULKHEAD DOOR FOR RAIL CARS AND THE LIKE

BACKGROUND OF THE INVENTION

The present invention relates generally to an apparatus and method for containing or confining cargo and, more particularly, to a bulkhead door that is movable within a cargo container, particularly in a rail car, and is capable of confining and separating a defined volume of space or cargo from other space or materials within the cargo container. The bulkhead door is particularly useful within a cargo transporting vehicle, such as a rail car, and its position within the car is adjustable over essentially the entire length of the rail car by latching the bulkhead door in latch-receiving track members secured to an interior roof and floor of the rail car. The bulkhead door is referred to as a "two piece" divider since two such bulkhead doors laterally disposed, side-by-side, are movable over two separate and parallel sets of tracks to fill the width of the rail car.

Apparatus for separating and confining cargo, such as a bulkhead door, commonly is used within a rail car for separating one manufacturer's goods from another, for separating different classes and sizes of cargo, and for preventing substantial movement and damage to cargo during transportation. Rail car bulkhead doors must have substantial strength, due to the substantial volume and weight of cargo that the bulkhead door is used to confine within a rail car. However, the bulkhead door should be easily moveable over the length of the rail car for the separation of cargo in the rail car and the bulkhead door should facilitate the loading of cargo in the rail car.

To date, attempts to reduce the weight of rail car bulkhead doors have resulted in doors that have insufficient strength, while sufficiently strong bulkhead doors have been extremely heavy and difficult to move. The bulkhead doors commonly used in rail cars are difficult to maneuver and maintain, require high labor and maintenance costs, and present constant safety hazards to operating personnel.

SUMMARY OF THE INVENTION

The drawbacks and deficiencies of the prior art bulkhead doors for use in separating cargo in a moveable cargo transporting vehicle are eliminated by an apparatus and method in accordance with the present invention.

A bulkhead door in accordance with the present invention is generally rectangular including a pair of parallel, spaced, vertically disposed metal side frame members extending essentially completely between a floor and a ceiling within a movable cargo transporting vehicle, such as a rail car. The vertical side frame members are interconnected by horizontally disposed metal frame members disposed at upper, middle and lower ends of the bulkhead door. The frame components are fabricated from one or more ultra-high strength steels that allow the use of reduced gauges (thicknesses) to form the frame members and, therefore, lighter steel frame components, without sacrificing the strength and durability of the bulkhead door.

The vertical and horizontal frame members define a rectangular metal bulkhead door frame having contained between the frame members a plurality of impact-resistant, chemically resistant, relatively light weight and structurally strong polymeric panels for confining and separating cargo. The material used to manufacture the panels is a light weight glass/mat reinforced thermoplastic composite. The panels are specifically constructed for added structural integrity of the plastic body of the bulkhead door.

Each of the spaced, vertically disposed metal side frame members contains door hardware which is interconnected by an ergonomically designed handle. The structurally effective hardware system contains a latching mechanism in each side frame member, each including a latch-actuated vertically extendable telescoping linkage arm and lock pins capable of actuation to extend upwardly and downwardly into upper and lower horizontal tracks or rails. The upwardly extendable lock pins are actuable to extend from an upper end of the vertical side frame members for receipt within one of a plurality of upper track apertures of the upper roof-secured track or rail. The downwardly extendable lock pins are actuable simultaneously with the upwardly extendable lock pins to extend downwardly from a lower end of the side frame members for receipt within one of a plurality of lower track apertures that are vertically aligned with and spaced from the upper track apertures, within the lower, floor-secured rail or track.

The bulkhead door of the present invention provides the following advantages in a modular two piece bulkhead door that:

a. Complies with impact and structural strength performance requirements through the use of ultra-high strength steels as frame members and specifically constructed thermoplastic composite panels held between frame members. The frame carries the basic vertical loads while the composite glass reinforced polymeric panels provide horizontal distribution of load;

b. The lighter sections of ultra-high strength steel and the light polymeric composite panels contribute to a substantial weight reduction comparable to the weight of commonly used steel doors. The lighter door provides easier handling and maneuvering and is, as a result, safer to operating personnel. The door weight reduction contributes to either additional cargo transportation or fuel savings for the rail road company;

c. Impact and structural strength, as well as chemical resistance, are achieved in a plurality of polymeric panels held between frame members by constructing each panel from a suitable structurally-reinforced polymeric composite material, such as continuous glass fiber-reinforced polypropylene. Each of the polymeric panels is separately repairable or replaceable. The panels are interchangeable except for a handle-surrounding panel. The handle panel is constructed in such a way that allows access to the handle from both front and back side thus contributing further to safety characteristics;

d. The features of the ergonomically designed handle and the effectiveness of the hardware system provide easier handling and maneuvering. A latching mechanism actuates the vertically extendable pins. The latching mechanism is contained within each side frame member and with handle movement, moves the pins upwardly and downwardly to secure them within upper and lower rail apertures at any desired position along the length of the rail car or other cargo transporting vehicle. The bulkhead door is normally biased in the locked position at any moment through a spring action in the latching mechanism that forces the handle to return to its locked position;

e. The innovative design of the modular structure allows the user to repair or replace components without the need to remove the bulkhead door from its hanger bracket. Each side frame member and each cross frame member can be easily unbolted and removed. After the hardware has been disconnected and removed, the frame members can be unbolted and removed, and the polymeric panels then can slide out without excessive effort. This results in field service that is simple and uncomplicated. Maintenance is done in place with savings in downtime and labor costs;

f. A variety of ultra high strength steels for fabrication of the side frame members and a glass reinforced mat thermoplastic composite for panels of the bulkhead door were chosen as building materials because of their ability to be recycled when there is a need for replacement. The use of environmentally friendly materials addresses one of the recent concerns of the end users in the railroad industry; and g. A unique design feature of this bulkhead door is the consolidation of components. A number of door models can be constructed utilizing the same thermoplastic composite panels, the same horizontal cross members of the frame and the same hardware and handle components. Part consolidation leads to reduction of inventory, thus contributing to savings.

BRIEF DESCRIPTION OF THE DRAWINGS

Other features and advantages are apparent in the method and apparatus claimed and disclosed or will become apparent to those skilled in the art from the following detailed description in conjunction with the accompanying drawings, wherein:

DETAILED DESCRIPTION OF THE PREFERRED EMBODIMENT

Figure 1:
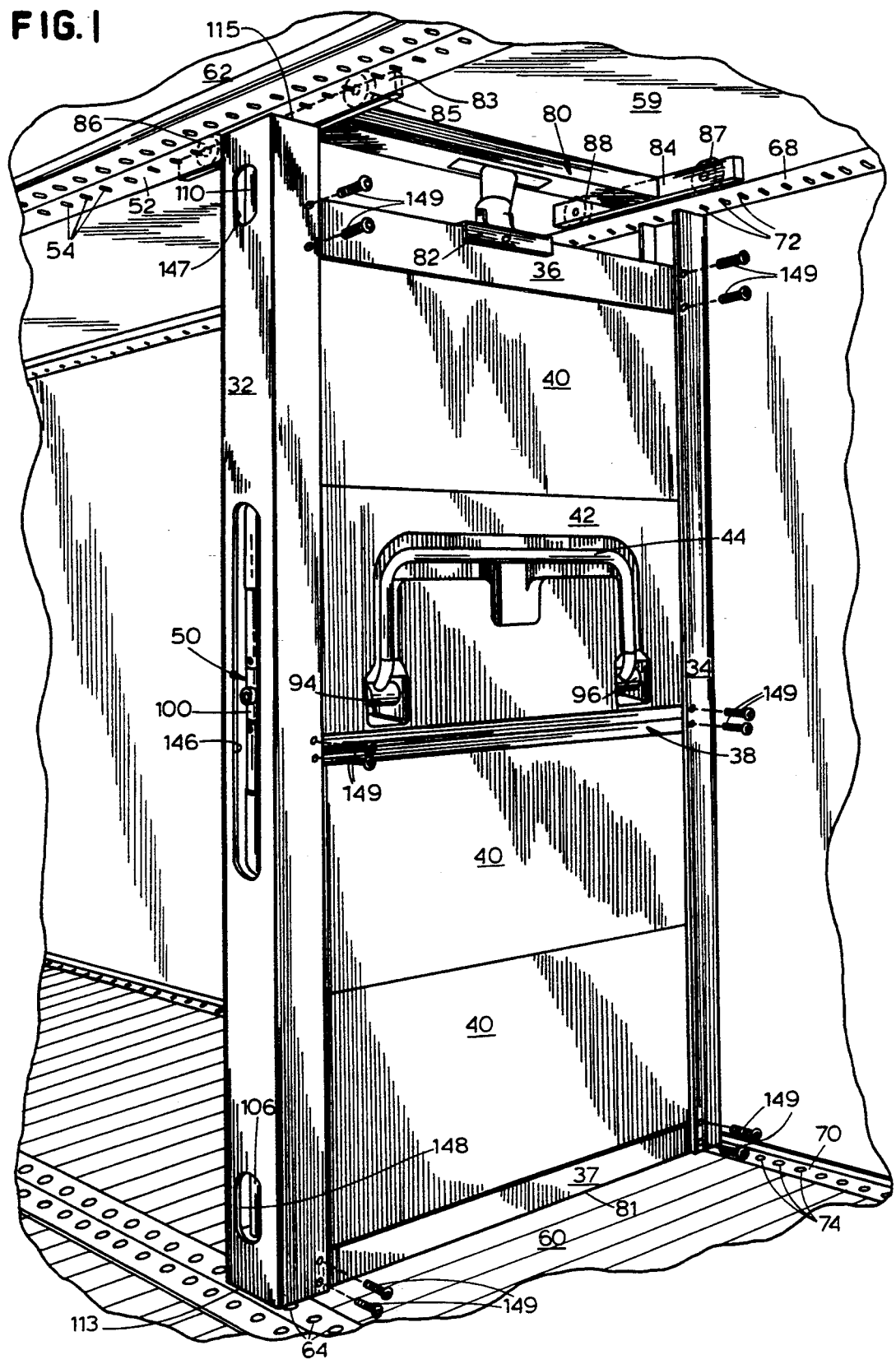
FIG. 1 is a perspective view of the bulkhead door constructed in accordance with the principles of the present invention.

Referring initially to FIG. 1, indicated generally at 30 is a bulkhead door apparatus constructed in accordance with a preferred embodiment of the present invention. Bulkhead door 30 includes a pair of vertical, spaced, generally U-shaped metal side frame members, indicated generally at 32 and 34, formed from ultra-high strength steel having a yield strength of at least about 145,000 psi, and preferably at least about 150,000 psi yield strength, such as that available from Lukens Steel, Coatesville, Pa., Lukens Hardware 400F having a thickness of 0.187 inch.

The side frame members 32 and 34 are held in vertical, spaced relation by a pair of side frame-interconnected horizontal, generally U-shaped upper and lower metal frame members, indicated generally at 36 and 37, respectively, and a I-beam shaped intermediate horizontally disposed steel cross frame member 38. One example of a suitable steel for the cross frame members 36, 37 and 38 is MARTINSITE Steel M-190, Inland Steel Co., having a yield strength of at least 190,000 psi and a thickness of 0.044 inch.

Figure 3:
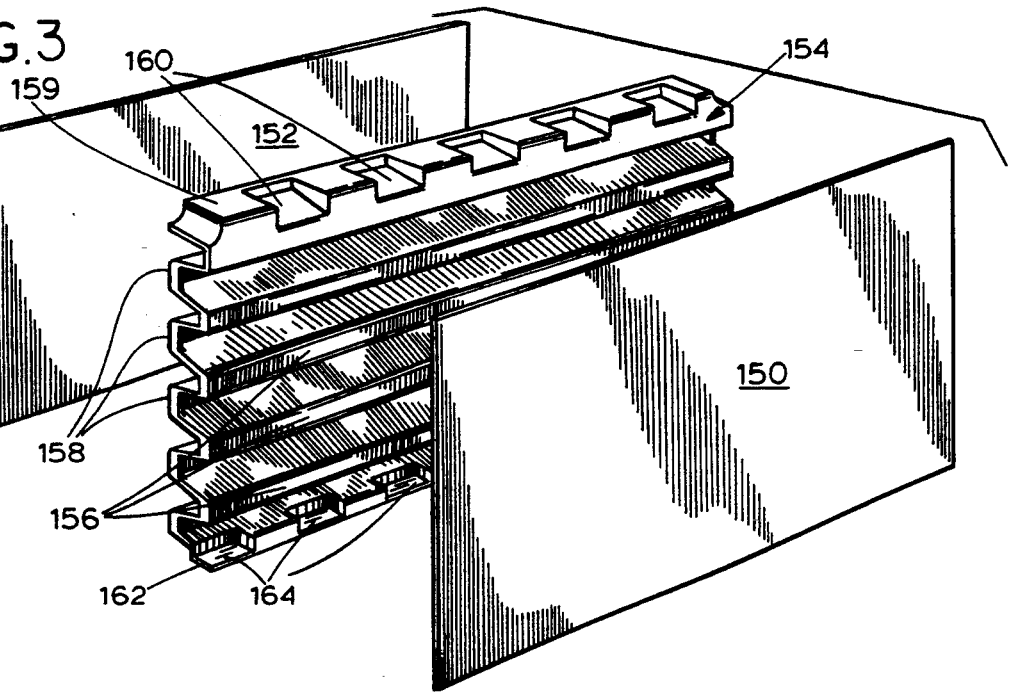
FIG. 3 is an exploded perspective view of one of the polymeric panels of the bulkhead door shown in FIGS. 1 and 2.
Figure 4:
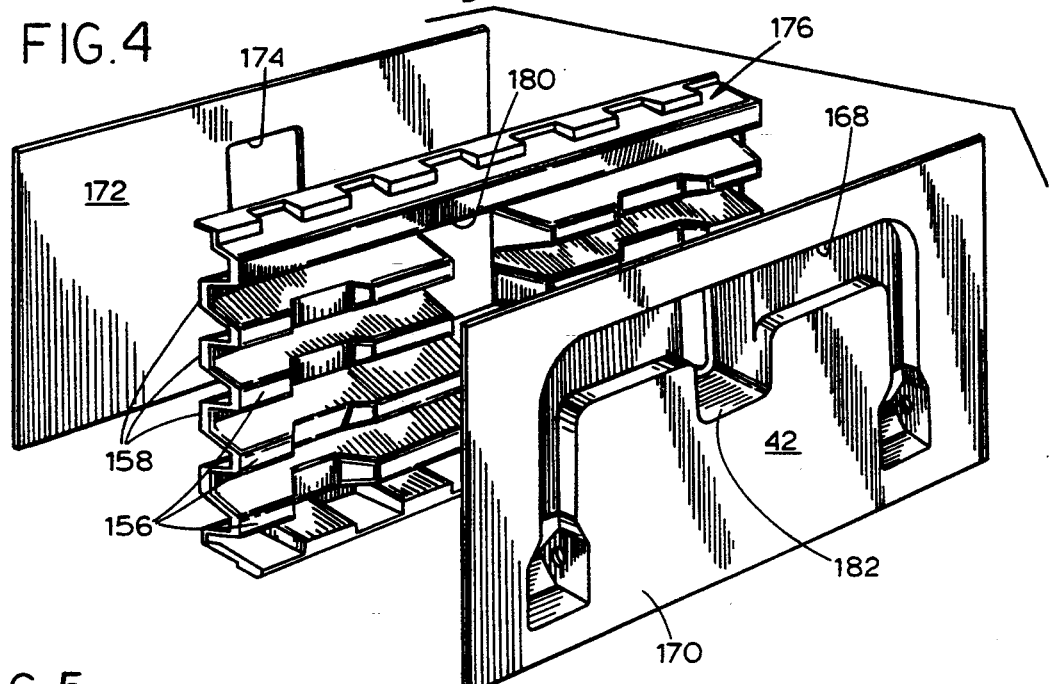
FIG. 4 is an exploded perspective view of the handle-surrounding panel of the bulkhead door.
Figure 5:
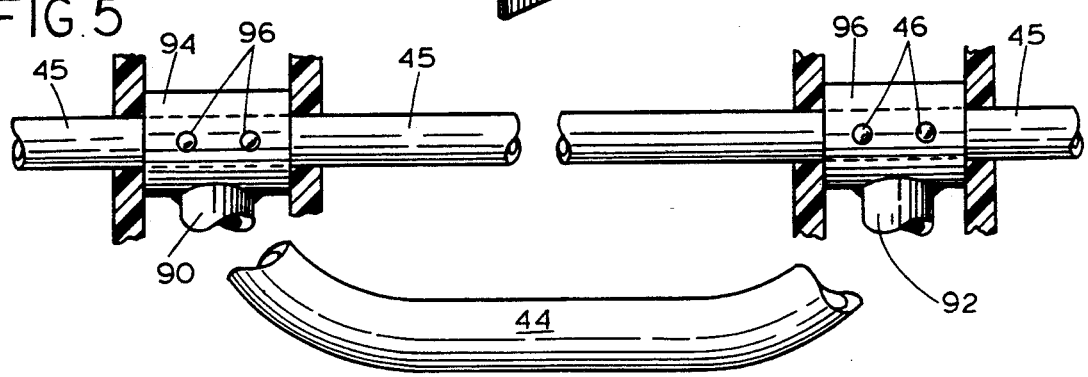
FIG. 5 is a fragmentary elevated view of the handle portion of the bulkhead door.

The door 30 includes three identical polymeric panels indicated generally at 40 each, in the preferred embodiment, including a corrugated core as shown in FIG. 3 and described in more detail hereafter; and an intermediate, latch handle-surrounding polymeric panel, indicated generally at 42, including a corrugated core, as shown in FIG. 4. The handle 44 is interconnected through an integral horizontal crossbar, generally indicated at 45 (FIG. 5), to a vertical latching mechanism, indicated generally at 50, within vertical frame member 32. The handle 44 also is interconnected through the integral horizontal crossbar 45 (FIG. 5) to an identical vertical latching mechanism (not shown) contained within vertical side frame member 34.

The advantages of this new bulkhead door are summarized as follows:

a. Weighs approximately 440 pounds. (A steel two piece bulkhead doors weigh approximately 750 pounds.) The lighter weight door provides easier handling, maneuvering and is safer for operating personnel. The door weight reduction allows for additional freight capacity and fuel savings due to the lower weight.

b. Exceeds the required impact specifications thus providing extended field service.

c. Provides effortless repair, maintenance reduction resulting in a cutback in labor costs. Its innovative modular design allows the user to repair or replace components without the need to remove the bulkhead door from its hanger brackets.

d. Is ergonomically designed, permitting safer and easier handling.

e. Is made with materials that can be recycled. This feature avoids any environmental issue where waste is created from worn or damaged components.

f. Includes a safety oriented feature. Individuals trapped behind the bulkhead door can be freed by unlocking the door from the backside.

g. Provides product consolidation. Utilization of identical panels, cross members and hardware components allows interchange of parts, on e.g., four different steel bulkhead door models, with this uniquely designed bulkhead door. Part consolidation reduces inventory and contributes to savings.

Referring again to FIGS. 1 and 2, a horizontal upper rail or track 52 is secured to an upper inner surface or roof 59 of a rail car or other cargo transporting vehicle and includes a plurality of pin-receiving apertures 54 in alignment with a vertically upwardly extended (actuated or latching) position of an upwardly extendable and retractable lock pin 56. Similarly, a lower rail or track 58 is horizontally secured to a floor 60 of the cargo transporting vehicle 62 and includes a plurality of lock pin-receiving apertures 64, each in vertical alignment with one of the apertures 54 in the upper rail or track 52, for receiving a lower extendable lock pin 66 (FIG. 2) when the latching mechanism 50 is actuated to the latched or locked position.

Figure 2:
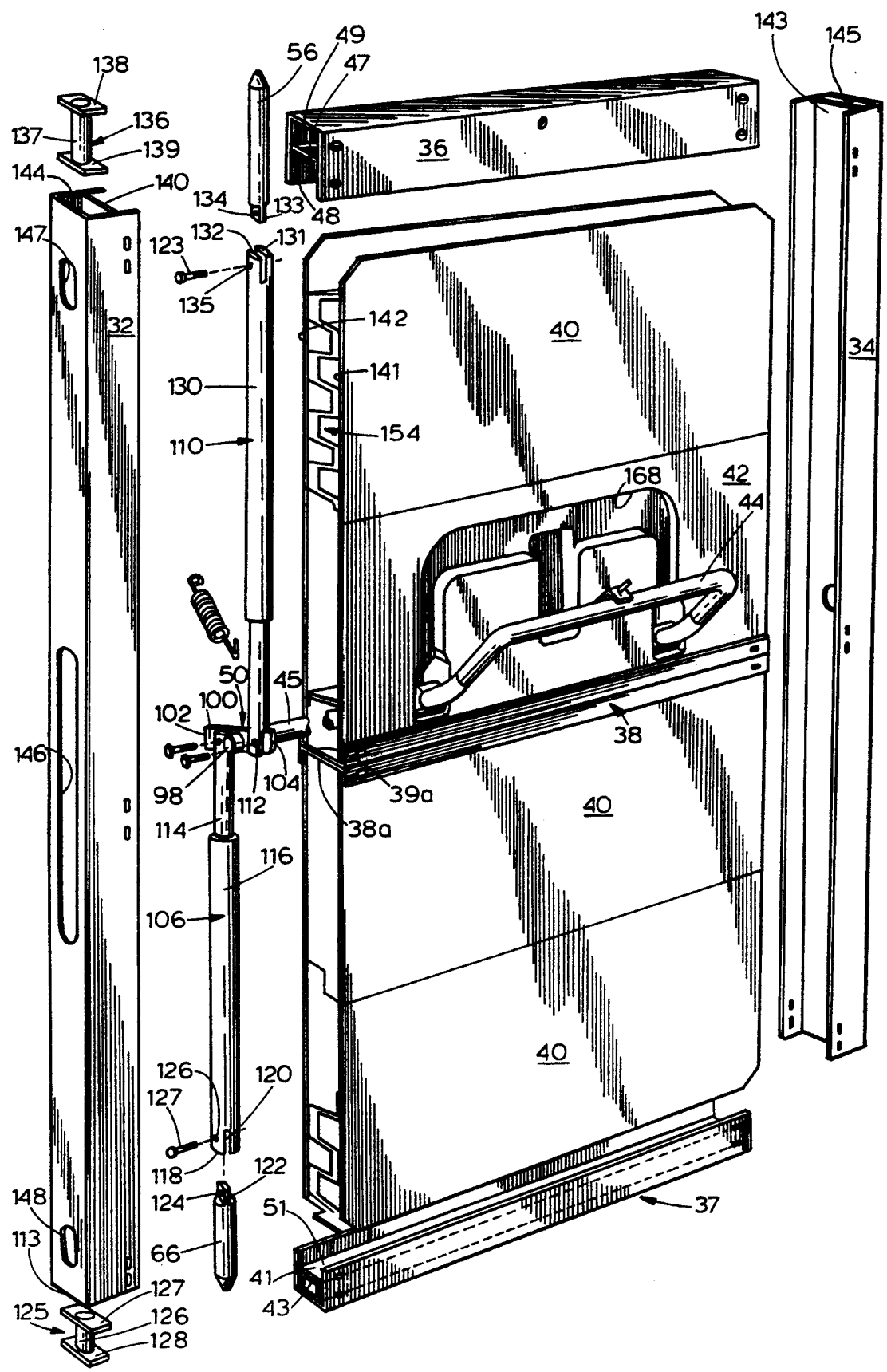
FIG. 2 is an exploded perspective view of the bulkhead door of FIG. 1.

Similarly, another rail or track 68 is secured to an inner surface of the roof 59 of the rail car, parallel to rail or track 52 and spaced therefrom, for receiving an upwardly extendable and retractable lock pin (not shown) identical to lock pin 56, as shown in FIG. 2. Another lower rail or track 70 is secured to the floor 60 of the cargo transporting vehicle 62 parallel to lower rail 58 and spaced therefrom sufficiently for receiving a lower extendable and retractable lock pin (not shown) identical to lower lock pin 66 of latching mechanism 50, as shown in FIG. 2. Apertures 72 in upper rail 68 and apertures 74 in lower rail 70 are in vertical alignment for simultaneously receiving upper and lower vertically extended lock pins carried within frame member 34 and corresponding in size, shape and construction to upper and lower lock pins 56 and 66, respectively, of latching mechanism 50, contained within the other side frame member 32.

An upper metal moveable door hanging member or trolley, indicated generally at 80, is slidably secured between upper spaced rails 52 and 68, and maintains a horizontal lower edge 81 of the bulkhead door 30, preferably at least about two inches above the floor 60 of the rail car or other cargo transporting vehicle 62. Trolley 80 is connected to the bulkhead door 30 through a hanger bracket indicated generally by reference numeral 82 welded to upper cross frame member 36. The bulkhead door 30 can be longitudinally moved over the entire length of the rails 52 and 68, from one longitudinal end of the rail car to the other. The trolley 80 provides movement of the door 30 over upper rails 52 and 68. The trolley 80 is movably mounted on the rails 52 and 68, for example, by rollers 85, 86, 87 and 88 (FIG. 1) that roll along an upper surface of the rails 52 and 68 over the length of the rails 52 and 68 when the bulkhead door is unlatched.

As best shown in FIG. 2, vertical side frame members 32 and 34 each includes a transversely disposed, elongate, internal metal cross frame member 140 or 143, respectively, creating a C-shaped vertical channel that receives outer edge portions 141 and 142 of panels 40 and 42. The side frame member components 140 and 143 can be formed from any steel and need not be ultra-high strength, e.g., 50,000 psi yield strength. Internal cross frame member 140 internally traverses the U-shaped metal, ultra-high strength steel side frame member 32 to provide an elongate box space 144 extending the full length of frame member 32 for receiving the latch mechanism 50. Similarly, internal cross frame member 143 internally traverses side frame member 34 to provide box space 145 for receiving an identical latch mechanism (not shown) within box space 145. Access opening 146 is provided within the frame member 32 for accommodating the latch mechanism 50 and for welding the linkage arms 106 and 110. Similarly, access opening 147 near the top of frame member 32, and access opening 148 near the bottom of the frame member 32 are provided for the assembly of pins 56 and 66 to linkage arms 106 and 110 by inserting pins 123 and 127 through the access openings. Further, the side frame members 32 and 34 can be manufactured in a plurality of lengths to accommodate the manufacture of a plurality of bulkhead doors of different lengths that include the same cross members 37 and 38 and the same panels 40 and 42.

The side frame members 32 and 34 are held in vertical, spaced relation by a pair of side frame-interconnected horizontal, generally U-shaped upper and lower metal frame members, indicated generally at 36 and 37, respectively, and a I-beam shaped intermediate horizontally disposed steel cross frame member 38 (FIG. 1). Upper cross member 36 includes a transversely disposed elongate, internal metal cross frame member 47 creating a C-shaped horizontal channel 48 that receives the outer edge portion of upper panel 40 and provides a box space 49 that gives additional strength to upper cross member 36. Lower cross frame member 37 includes a U-shaped support member 41 having a steel box 43 carried thereunder (FIG. 2), over the full length of the cross member 37 for additional support across the bottom of the door 30, where load forces are greatest. This assembly of the lower cross member 37 results in a C-shaped horizontal channel 51 that receives the outer portion of the lower panel 40 and a strengthened box space 43 having additional strength. The I-beam shaped intermedial cross member 38 is formed from U-shaped frame portions 38a and 39a welded together (FIG. 2) that separate upper panel 40 and 42 from lower panels 40 and provides additional strength to the central position of the bulkhead door 30. The upper cross member 36 and its components; the lower cross member 37 and its components and the cross member 38 are all formed using ultra-high strength steel, for example, MARTINSITE Steel M-190, having a yield strength of at least 190,000 psi and a thickness of 0.44 inch.

The side frame members 32 and 34 are removably secured to the cross frame members 36, 37 and 38 with pairs of bolts 149 that are easily inserted and removed for removal and replacement of modular door components, for example, panels 40 and 42 or side frame members 32 and 34, and cross members 37 and 38. This frame configuration provides for easy assembly and disassembly of the bulkhead door 30, fast construction and replacement of parts, while providing unexpected strength and light weight.

As best shown in FIG. 3, panels 40 include a front planar sheet 150, a back planar sheet 152 and an intermediate corrugated structure 154 sandwiched therebetween. To achieve the full advantage of light weight and strength, the planar front and back sheets 150 and 152 and the corrugated structure 154 are manufactured from sheets of a thermoplastic, glass-reinforced, polymeric material, for example, AZDEL ® of G. E. Plastics, which is a composite of an olefinic polymer (polypropylene) filled with about 20% to about 80% by weight continuous or chopped filament glass fibers, preferably about 35% to about 40% by weight continuous filament glass fiber. AZDEL ® SM/10400, for example, is 0.145 inch thick and used for the front and back planar sheets 150 and 152 and corrugated structure 154 and has a coefficient of thermal expansion over the range of about $-40°$ C. to 204° C., in the range of about $2.0 \times 10^{-5}$ mm/mm-°C. to about $2.5 \times 10^{-5}$ mm/mm-°C., and has a DYNATUP impact energy, as measured by ASTM D 3763, of at least about 20 foot-pounds, preferably at least about 25 foot-pounds. Similarly, the corrugated intermediate structure 154 is made by compression molding technology using a thermoplastic composite polymer, such as glass-reinforced polypropylene, containing, preferably, about 35% to about 40% continuous filament glass fiber. The corrugated structure 154 is formed in a serpentine shape, as best shown in FIG. 3, having a preferred thickness of about 0.10 to about 0.12 inch.

The serpentine or corrugated shape of the reinforcing intermediate structure 154 is manufactured to provide strength to the resulting panel and, as shown in FIG. 3, to include a plurality of vertically aligned, spaced, vertical planar portions 156, facing an inner surface of front planar sheet 150, and another plurality of vertically aligned, spaced, vertical planar portions 158 facing an inner surface of rear planar sheet 152. The vertical planar portions 156 and 158 are structurally bonded to the inner surfaces of panels 150 and 152, preferably using melt fusion technology, as described in more detail hereafter. The corrugated structure 154 sandwiched between planar panels 150 and 152 spaces the panels 150 and 152 and provides excellent structural strength and stability, together with light weight. An upper planar edge 159 of compression molded, corrugated structure 154 includes a plurality of spaced depressions 160 for additional structural strength. Similarly, a lower edge 162 of the corrugated structure 154 is formed to be planar and horizontal with the exception of depressions 164 compression molded for added strength. This design of the corrugated structure 154 provides a tongue and groove connection of the adjacent assembled panels 40 and 40 in the lower portion of the door, and 40 and 42 in the upper portion of the door 30 for added strength.

The handle-surrounding panel 42 is constructed as follows. A front planar sheet 170 is made from thermoplastic composite material, such as glass-reinforced polypropylene, and is manufactured by compression molding to include an inverted U-shaped access opening 168 where the actuating handle 44 is positioned and accommodated. A corrugated structure 176, forming a core of panel 42 and shaped like corrugated structure 154 in panels 40, includes an access opening 180 coextensive with an access opening 174 in the planar rear sheet 172. Similarly, front planar panel 170 includes access opening 182 coextensive with access opening 180 in corrugated member 176 and coextensive with access opening 174 in rear sheet 172. The access openings 174, 180 and 182 enable a person trapped behind the bulkhead door 30 to reach through access openings 174 and 180 to actuate handle 44. Openings 174, 180 and 182 permit complete extension of the user's hand from the rear side of the bulkhead door 30 through the front sheet 170 for complete disengagement of the latching mechanism from a rear side of the bulkhead door 30. Tongue and groove connections between the corrugated cores of the two panels 40 and 42 are the same as the tongue and groove connections described above with reference to the interfitting of corrugated structures 154 and 176.

To achieve full strength in the panels 40, 42, the corrugated structures 154 and 176 are heat bonded to inner surfaces of polymeric sheets 150, 152, 170 and 172. The heat bonding is carried out by heating the planar portions 156, and 158 of the corrugated structures 154 and 176 to 400° F. to 430° F. and by heating the corresponding contact areas of inner surfaces of sheets 150, 152, 170 and 172 to about the same temperature. The heated inner surfaces of the sheets 150, 152, 170 and 172 are held against the heated corrugated structures 154 and 176 under a pressure of about 10–50 psi for 20–30 seconds to heat bond the planar portions 156 and 158 of the corrugated panels 154 and 176 to the inner surfaces of planar sheets 150, 152, 170 and 172 thus achieving a melt bond of the corrugated structures 154 and 176 to the interior surfaces of the exterior sheets 150, 152, 170 and 172. The constructed panels 40 and 42 are then cooled, e.g., stored at ambient temperature, to complete the bond.

The bulkhead door 30 of the present invention, is formed (a) from ultra-high strength steel vertical and horizontal steel frame members 32, 34, 36, 37 and 38, which provide the necessary load restraining strength and light weight by having a yield strength of at least about 140,000 psi and (b) from thermoplastic composite panels 40 and 42 including thermoplastic composite core structures 154 and 176, having a serpentine configuration and which provide light weight and high impact resistance, e.g., formed from AZDEL® glass-reinforced polypropylene.

It is important that the steel side frame members 32 and 34 have exceptional strength to withstand shifting and sudden impact of heavy cargo, particularly when the rail car lurches forward or stops abruptly. In order to avoid bending of the side frame members under normal loading conditions, the side member 32 and 34 have been designed to withstand as much as 600,000 pounds of coupler force in a 100 ton, fully loaded railroad car.

The bulkhead door 30 remains locked in position through the actuation of the latch mechanism 50. The actuation of the latch mechanism 50 and the interconnection of the latch mechanism 50 to the latch-actuator or handle 44 are hereinafter described in more detail with reference to FIGS. 2 and 5. The latch-actuator or handle 44 is shaped in the form of an inverted U. Handle leg ends 90 and 92 (FIG. 5) of the inverted U-shaped actuator 44 are rigidly connected to tubular collars 94 and 96, each surrounding crossbar 45, such as by welding. The collars 94 and 96 connect the handle 44 to the crossbar 45 by set bolts 46 that extend through the collars 94 and 96 and into or through crossbar 45, to prevent collars 94 and 96 from rotating about the crossbar 45. Crossbar 45 includes end 98 (FIG. 2) that is operatively connected to latch mechanism 50 within the vertical side frame member 32. Crossbar 45 also includes another end (not shown) that is operatively connected to the other latch mechanism (not shown) which is within the vertical metal frame member 34, and which is identical to the latching mechanism 50. The crossbar 45 is rigidly connected to a transversely extending, pivotable linkage bar 100, near end 98 of horizontal crossbar 45, approximately midway between free ends 102 and 104 of the pivotable linkage bar 100. In this manner, a 90° rotation of the latch-actuator or handle 44, rotates the crossbar 45 and the pivotable linkage bar 100 to the same degree (90°), from a vertical position, as shown in FIG. 1, to a horizontal position, as shown approximately in FIG. 2.

The latch mechanism 50 includes a lower telescoping linkage arm, generally indicated at 106, that is pivotally and eccentrically connected through pin 108 to linkage bar 100 near free end 102. The latch mechanism 50 also includes an upper telescoping linkage arm, indicated generally at 110 that is pivotally and eccentrically connected to linkage bar 100 by pin 112 near the other free end 104 of linkage bar 100. By the above-described eccentric connections of lower linkage arm 106 and upper linkage arm 110 to the linkage bar 100, a 90° rotation of handle 44 from a horizontal (FIG. 2) to a vertical position (FIG. 1) causes a 90° rotation of linkage bar 100 which causes the lower and upper linkage arms 106 and 110 to move vertically so as to extend downwardly and upwardly, respectively, extending beyond lower and upper ends 113, 115 of vertical metal side frame member 32. The vertical movement or extension of lower linkage arm 106 lowers lock pin 66 sufficiently so that lock pin 66 is received within one of the lower apertures 64 in lower tracks 58. Similarly, the vertical movement or extension of upper latch bar 110 raises lock pin 56 sufficiently so that the lock pin 56 is received within one of the upper apertures 54 in upper rail 52. In this manner, the bulkhead door 30 is secured at a desired longitudinal position within the interior of the rail car 62. Although the other latch mechanism held within vertical metal side frame member 34 is not shown, this other latch mechanism is constructed as an exact counterpart of latch mechanism 50 held within vertical metal frame member 32.

As best shown in FIG. 2, lower and upper telescoping linkage arms 106 and 110 are constructed to include solid cylindrical metal bars 114 and 129, respectively, each pivotally secured at one end to opposite sides of the linkage bar 100, and a hollow cylindrical steel tubes 116 and 130 are each rigidly secured over a free end of solid bar 114 or 129, respectively, to provide a hollow free latch bar end 118 or 131 for pivotal attachment to lock pin 66 or 56. Solid cylindrical bars 114 and 129 telescope into tubes 116 and 130 during installation to enable the adjustment of the length of each linkage arm 106 and 110. After the proper length of each linkage arm 106 and 110 is determined within each rail car, the solid bars 114 and 129 are fixedly secured, such as by welding, to the tubes 116 and 130, respectively.

The free ends 118 and 131 of the hollow steel tubes 116 and 130 each include a vertical slot 120 and 132, respectively, disposed in a plane perpendicular to the planar faces of the polymeric panels 40. The lock pins 66 and 56 each include a flattened connecting end 122 and 133, respectively, adapted to fit within slots 120 and 132 in free ends 118 and 131 of the hollow steel tubes 116 and 130. The lock pins 66 and 56 also include apertures 124 and 134, respectively, extending completely through pins 66 and 56 at flattened ends 122 and 133 and adapted to be aligned with apertures 126 and 135 in the free ends 118 and 131 of hollow steel tubes 116 and 130 for receiving pin 127 through aligned apertures 124 and 126 in lower linkage arm 106 and for receiving pin 123 through aligned apertures 134 and 135 in upper linkage arm 110. Lock pins 66 and 56 may pivot about pins 127 and 123, relative to telescoping linkage arms 106 and 110, over a relatively small arc, e.g., 30°, within a plane perpendicular to the planar faces of panels 40 during locking and release of the lock pins 66 and 56.

The pivotal mounting of the lock pins 66 and 56 with respect to telescoping linkage arms 106 and 110 enables easier insertion and removal of the lock pins 66 and 56 into and from apertures 64 and 54, while permitting relatively close tolerances between outer dimensions of lock pins 66 and 56 and the diameter of apertures 64 and 54 to prevent substantial longitudinal movement of the bulkhead door 30 when locked in place. More particularly, the pivotal mounting of pins 66 and 56 with respect to linkage arms 106 and 110 is desirable since rotation of the linkage bar 100 between latched and unlatched positions will dispose the lower and upper linkage arms 106 and 110 at a non-vertical angle with respect to the floor 60 and roof 59 of the rail car 62. The pivotal mounting of the lock pins 66 and 56 with respect to their respective linkage arms 106 and 110 will maintain the lock pins 66 and 56 vertical with respect to the floor 60 and roof 59 to provide a relatively tight fit of lock pins 66 and 56 in lower apertures 64 and upper apertures 54 while providing ease of unlatching.

Guide tubes, indicated generally at 125 and 136, are located at the lower and upper ends, respectively, of vertical frame member 32. Guide tubes 125 and 136 include hollow tubular center portions 126 and 137 and perpendicularly aligned, integral rectangular planar end plates 127 and 128; 138 and 139 adapted to fit relatively closely within the interior dimensions of rectangular vertical metal side frame member 32. The guide tubes 125 and 136 serve as guides to maintain the pins 66 and 56 in vertical alignment within the rail apertures 64 and 54. Identical structure is provided in both side frame members 32 and 34.

The bulkhead door 30 weighs 500 pounds or less, preferably less than 450 pounds, and should be capable of withstanding at least 75,000 pounds of force distributed uniformly over the entire door without bending the frame members and without damage to the panels 40, 42. To achieve the full advantage of the present invention, the bulkhead door 30 can withstand at least 90,000 pounds of force distributed evenly over a major surface, without side or cross frame member bending or panel rupture, and preferably can withstand 100,000 to 110,000 pounds of force, as in the case of the preferred door described above, while having a weight less than 500 pounds, preferably less than 450 pounds. The bulkhead door 30 complies with Association of American Railroads (AAR) Specification M-946-76 while being lighter weight than an existing bulkhead door in compliance.

Numerous modifications and alternative embodiments of the present invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A relatively light weight cargo separator for use in a movable cargo transporting vehicle, said cargo separator having a front side and a rear side and comprising:
    a vertically disposed, substantially rectangular metallic, outer frame having a yield strength of at least about 140,000 psi;
    and a plurality of panels each having an inner core structure supported within said frame;
    said panels comprising front and rear planar outer members and an inner core member sandwiched between said outer members to form said panel;
    each of said outer members on said panels being composed of structurally-reinforced, rigid polymeric sheet material; and
    said inner core structure on each of said panels being formed from structurally-reinforced rigid polymeric material in a corrugated shape to contact both the front and rear outer members.

2. A cargo separator as recited in claim 1 and comprising:
    a vertically disposed latching mechanism carried by said outer frame and actuable between latching and non-latching positions;
    a handle operatively connected to said latching mechanism for actuating said latching mechanism;
    means for movement of the handle between actuating and non-actuating positions; and
    said handle being located on said front side of said cargo separator to permit actuation of said handle, between said actuating and non-actuating positions thereof, from said front side of said cargo separator.

3. A cargo separator as recited in claim 2, wherein said handle is surrounded by a handle-surrounding panel supported within said outer frame.

4. A cargo separator as recited in claim 2 and comprising:

means for permitting manipulation of said handle, between said actuating and non-actuating positions thereof, from both front and rear sides of said cargo separator.

5. A cargo separator as recited in claim 4, wherein said means for permitting manipulation of said handle comprises an access opening extending completely through said handle-surrounding panel.

6. A cargo separator as recited in claim 1, wherein the outer members on said panels are formed from a glass-reinforced thermoplastic sheet material.

7. A cargo separator as defined in claim 2 and for use with a cargo transporting vehicle having pin-receiving means vertically spaced from said outer frame, wherein the latching mechanism of said cargo separator includes:
    vertically disposed pin means;
    means mounting said pin means for vertical movement between a latching first position in which said pin means extends vertically beyond the frame member, and a non-latching second position in which said pin means is carried within the frame member; and
    actuation means, operatively interconnected between the handle and the pin means, and responsive to rotation of the handle to move the pin means from its second to its first position, so that the pin can be received by said pin-receiving means.

8. A cargo separator as recited in claim 7, wherein:
    said frame comprises a pair of opposed, vertical side frame members and upper, lower and intermediate horizontal cross frame members that are removably connected to surround said panels; and
    said separator includes two identical latching mechanisms each having a pin means carried in a respective, vertical side frame member.

9. A relatively light weight cargo separator for use in a movable cargo transporting vehicle, said cargo separator having a front side and a rear side and comprising:
    a vertically disposed, substantially rectangular metallic, outer frame having a yield strength of at least about 140,000 psi;
    and a plurality of panels each having an inner core structure supported within said frame;
    said panels comprising front and rear planar outer members and an inner core member sandwiched between said outer members to form said panel;
    each of said outer members on said panels being composed of glass-reinforced, rigid polypropylene sheet material including about 20% to about 80%, by weight, continuous and/or chopped filament glass fibers; and
    said inner core structure on each of said panels being formed from structurally-reinforced rigid polymeric material.

10. A cargo separator as recited in claim 9, wherein the glass-reinforced polypropylene has a coefficient of thermal expansion, over the range of about $-40°$ C. to $204°$ C., of about $2.0 \times 10^{-5}$ mm/mm-°C. to about $2.5 \times 10^{-5}$ mm/mm-°C.

11. A cargo separator as recited in claim 9, wherein the glass-reinforced polypropylene has a DYNATUP impact energy of at least about 20 foot-pounds.

12. A relatively light weight cargo separator for use in a movable cargo transporting vehicle, said cargo separator having a front side and a rear side and comprising:
    a vertically disposed, substantially rectangular metallic, outer frame having a yield strength of at least about 140,000 psi;
    and a plurality of panels each having an inner core structure supported within said frame;
    said panels comprising front and rear planar outer members and an inner core member sandwiched between said outer members to form said panel;
    each of said outer menders on said panels being composed of structurally-reinforced, rigid polymeric sheet material; and
    said inner core structure on each of said panels being formed from a continuous sheet of thermoplastic, structurally-reinforced composite sheet material, compression molded in a serpentine shape and disposed in contact with both the front and rear outer members.

13. A cargo separator as defined in claim 12, wherein each outer member is formed from a sheet of structurally-reinforced, composite sheet material reinforced with 30% to about 50%, by weight, continuous and/or chopped filament glass fibers.

14. A relatively light weight cargo separator for use in a movable cargo transporting vehicle, said cargo separator having a front side and a rear side and comprising:
    a vertically disposed, substantially rectangular metallic, outer frame;
    a plurality of panels supported within said frame;
    said plurality of panels including upper and lower end panels and an intermediate handle-surrounding panel located between said upper and lower end panels;
    each of said panels comprising front and rear planar outer members and an inner core member, said inner core member being sandwiched between said outer members to form said panel;
    each of said outer members on said end panels and the rear outer member on said intermediate handle-surrounding panel being composed of relatively thin, glass fiber-reinforced, thermoplastic sheet material structurally reinforced with continuous glass fibers; and
    said inner core member in each of said panels being composed of compression molded, continuous glass fiber-reinforced thermoplastic material, molded in a corrugated shape to support both the frond and rear outer members.

15. The cargo separator as recited in claim 14, wherein the inner core members include planar portions heat bonded to inner surfaces of polymeric outer panel portions.

16. A cargo separator as recited in claim 14 and comprising:
    a vertically disposed latching mechanism carried by said rectangular frame and actuable between latching and non-latching positions;
    a horizontally disposed handle for actuating said latching mechanism;
    means adjacent said intermediate panel for movement of the handle between actuating and non-actuating positions;
    said handle being located on said front side of said cargo separator to permit actuation of said handle, between said actuating and non-actuating positions thereof, from said front side of said cargo separator; and an access opening extending through said intermediate handle-surrounding panel to permit manipulation of said handle, between said actuating and non-actuating positions thereof, from said rear side of said cargo separator.

17. In combination:
a material storage area having defined dimensions and including a roof, a floor, two opposed, spaced side walls and two opposed, spaced end walls;
a movable material separator for stable disposition in a plurality of desired locations within said storage area;
said movable separator comprising a metal frame member and a polymeric panel carried by said metal frame member, said panel including front and rear outer members sandwiching a structurally reinforced, polymeric sheet material reinforcing member therebetween;
said sheet material reinforcing member formed from a continuous sheet of structurally-reinforced polymeric material, molded in a serpentine shape and disposed in contact with both the front and rear outer members;
a vertically disposed latch pin disposed within said metal frame member;
said metal frame member of said separator including an elongate channel for carrying said latch pin;
means mounting said latch pin for vertical movement, in said channel, between a non-latching position and a latching position in which the latch pin extends vertically upwardly or downwardly from the frame member;
said storage area comprising a rigid rail secured to the roof or floor of the storage area and including a plurality of spaced-apart, pin-receiving means for receiving said latch pin when said pin is in its latching position;
actuable handle means operatively connected to said separator; and
linkage means operatively interconnecting the handle means to the latch pin for moving the latch pin upwardly or downwardly to its latching position in response to actuation of said handle means.

18. A combination as defined in claim 17, wherein the storage area includes:
two aligned, opposed rails, one secured to the roof and one secured to the floor;
each rail including a plurality of spaced-apart pin-receiving means in vertical alignment with pin-receiving means of the opposed rail; and
each of said pin-receiving means comprising means for receiving a latch pin.

19. A combination as defined in claim 18, wherein said storage area includes:
first and second additional, vertically aligned, opposed rails, the first additional rail being secured to the roof and the second additional rail being secured to the floor.

20. The separator of claim 17, wherein the metal frame member includes two parallel, spaced vertical frame members each provided in a plurality of lengths to accommodate panels of varying lengths and different spacing between said floor and roof.

21. A cargo separator for use in a rail car comprising:
a rectangular steel frame formed from steel having a yield strength of at least 140,000 pounds;
a plurality of composite polymeric panels disposed adjacent one another and held in place within said steel frame;
said polymeric panels including front and rear outer polymeric sheets separated by and in contact with a structurally-reinforced, rigid polymeric sheet, molded in a serpentine shape to support both the front and rear outer polymeric sheets;
said separator capable of withstanding at least 75,000 pounds of force distributed evenly over a major surface thereof without bending the frame, and wherein the separator has a weight less than about 500 pounds.

22. The separator as recited in claim 21, wherein the separator is capable of withstanding at least 90,000 pounds of uniformly distributed force and has a weight of 450 pounds or less.

23. The separator as recited in claim 22, wherein the separator is capable of withstanding at least 100,000 pounds of uniformly distributed force and has a weight of 450 pounds or less.

24. The separator as recited in claim 23, wherein the separator is capable of withstanding about 100,000 to about 110,000 pounds of uniformly distributed force and has a weight of 450 pounds or less.

25. A cargo door releasably locked and longitudinally movable in an unlocked position within a rail car comprising:
a rectangular steel frame including a plurality of detachable frame members formed from steel having a yield strength of at least 140,000 pounds;
a plurality of polymeric panels secured within said steel frame and slidably insertable and removable from said steel frame, said panels formed from front and rear planar, structurally-reinforced polymeric sheets having a core of molded, serpentine-shaped, structurally-reinforced polymeric sheet material disposed between said front and rear sheets, contacting and supporting the front and rear polymeric sheets; and
said door being movably secured to an inside of said rail car such that the frame is capable of disassembly and reassembly without disconnecting the door from the inside of the rail car.

* * * * *